United States Patent [19]
Lu

[11] 3,723,778
[45] Mar. 27, 1973

[54] THICKNESS SENSOR FOR SPUTTERING SYSTEMS UTILIZING MAGNETIC DEFLECTION OF ELECTRONS FOR THERMAL PROTECTION

[75] Inventor: Chih-Shun Lu, Jamesville, N.Y.

[73] Assignee: Inficon Inc., East Syracuse, N.Y.

[22] Filed: Feb. 7, 1972

[21] Appl. No.: 224,028

[52] U.S. Cl. ............... 310/8.9, 310/9.1, 310/8.2, 73/150, 117/106
[51] Int. Cl. ........................................... H01v 7/00
[58] Field of Search............. 310/8, 8.1, 8.2, 8.9, 9.1, 310/9.4, 9.5; 236/1 F; 73/362.6, 150; 117/106; 331/44, 65, 66

[56] References Cited

UNITED STATES PATENTS

| 2,321,285 | 6/1943 | Ehret et al. | 310/9.3 X |
| 3,246,287 | 4/1966 | Benson | 310/8.1 X |
| 3,327,142 | 6/1967 | Elwood et al. | 310/8.9 X |
| 3,553,602 | 1/1971 | Brothers et al. | 310/8.9 X |

Primary Examiner—J. D. Miller
Assistant Examiner—Mark O. Budd
Attorney—Bruns & Jenney

[57] ABSTRACT

An improved sensor for monitoring the thickness of thin films deposited by sputtering. The sensor employs a conventional quartz crystal and heating of the crystal is prevented by providing a localized magnetic field which substantially eliminates electron bombardment of the exposed area of the crystal. The magnet that produces the field is provided with a water cooled shield. The sensor can be used in either RF or DC sputtering systems.

7 Claims, 6 Drawing Figures

PATENTED MAR 27 1973 3,723,778

THICKNESS SENSOR FOR SPUTTERING SYSTEMS UTILIZING MAGNETIC DEFLECTION OF ELECTRONS FOR THERMAL PROTECTION

BACKGROUND OF THE INVENTION

This invention relates generally to thin film production, and has particular reference to an improved crystal sensor for monitoring the thickness of thin films deposited by sputtering.

The use of a piezoelectric quartz crystal microbalance for monitoring the thickness of thin films during deposition is well known. In such use, the sensor is usually an AT-cut quartz crystal oscillating in a thickness shear mode and one surface of the crystal is exposed to receive the deposited material. The change in the resonant frequency of the crystal is a measure of the deposited mass. Knowing the density of the deposited material and with proper electronic circuitry, direct readout of thickness is possible. Thickness measurements can be made continuously by this method with one angstrom resolution.

While quartz crystal thickness sensors have been used in sputtering systems, they frequently fail to perform reliably because they become heated by electron bombardment during the sputtering process. The heating causes frequency instability and even crystal failure. In attempts to solve this problem, crystals have been shielded by a heavy metal screen which absorbs the heat but has the disadvantage that it reduces the amount of material deposited on the crystal and causes the deposit to be non-uniform. Both of these seriously affect the sensitivity and accuracy of the crystal.

SUMMARY OF THE INVENTION

In the present invention, the crystal sensor is provided with a localized magnetic field parallel to the plane of the crystal directly above the exposed area thereof. The magnetic cross field is strong enough to prevent electrons from reaching the crystal and heating it but has little effect on the trajectories of ionized gas molecules or sputtered materials. With this arrangement, the sensitivity and accuracy of the quartz crystal can be fully realized to produce the desired result.

The magnetic field is produced by one or more magnets which can be permanent or electromagnets. The magnet or magnets are provided with a water cooled shield so that they also are protected against overheating by electron bombardment.

DESCRIPTION OF THE PREFERRED EMBODIMENTS

Figure 1:
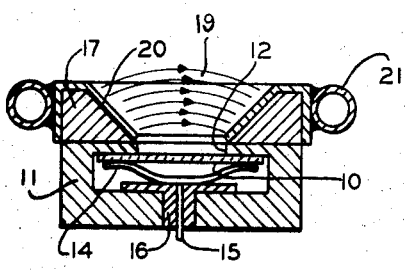
FIG. 1 is a vertical sectional view through a crystal thickness sensor embodying the invention.

The thickness sensor somewhat diagrammatically illustrated in FIG. 1 includes a quartz crystal 10 and a holder or support 11 for the crystal which can also serve as an electrode. The crystal support has an opening 12 in its top to expose a portion of the crystal so that it can receive the material being deposited. The crystal is held against the top wall of the support by spring contact fingers 14 to which an electrical conductor 15 is connected. The fingers and conductor are insulated from the support by insulating material 16. The sensor structure thus far described is substantially conventional.

Figure 2:
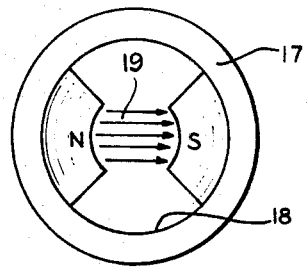
FIG. 2 is a top plan view of the magnet employed in the sensor of FIG. 1.

In accord with the invention, a magnet 17 is mounted on the top wall of the crystal support surrounding the top opening 12. As shown in FIG. 2, the magnet in this embodiment is disc shaped with a central opening 18 and the poles of the magnet project into the opening in diametrically opposed relation to one another. The poles extend to the periphery of the opening 12 as best shown in FIG. 1 and produce a magnetic field that is substantially parallel to the plane of crystal 10 directly above its exposed area as indicated by the arrows 19. The magnetic cross field is sufficiently strong to prevent electrons from reaching the crystal and heating it but has little effect on the trajectories of ionized gas molecules or sputtered materials. Thus, the sensitivity and accuracy of the sensor can be fully realized without the problem of crystal frequency instability. The magnetic field should be strong enough to deflect electrons with the highest energy away from the crystal but the exact configuration of the field is not critical, nor does it need to be uniform above the crystal. Because the magnetic field is localized in a relatively small area, it does not affect the normal operation of the sputtering process.

Magnet 17 is a permanent magnet but it will be understood that an electromagnet can be used just as well. Similarly, more than one magnet may be employed, and wherever the term magnet is used herein, it is intended that the term include one or more magnets of either the permanent or electromagnetic type.

Magnet 17 is provided with a shield 20 that is cooled by a water tube 21. This is required so that the magnet itself will not become overheated by electron bombardment in the unprotected area surrounding the top opening 12.

Figure 4:
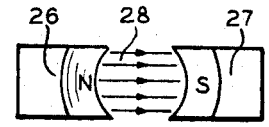
FIG. 4 is a top plan view of the magnet armatures employed in the sensor of FIG. 3.
Figure 3:
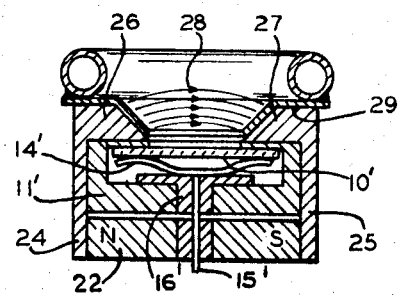
FIG. 3 is a vertical sectional view through a modified form of the sensor of the invention.

FIG. 3 diagrammatically illustrates a modified form of the thickness sensor of the invention. In this embodiment, the crystal 10', support 11' and contact fingers 14' are the same as those of FIG. 1. However, the magnet 22 is located below the support and its north and south poles are in metal to metal contact with the depending legs 24 and 25, respectively, of mild steel armatures 26 and 27, FIGS. 3 and 4. As a result of this construction, the armatures produce a magnetic field like the field produced by magnet 17, as is indicated by arrows 28.

The armatures 26,27 are also provided with a water cooled shield 29 to protect them against overheating due to electron bombardment.

Figure 6:
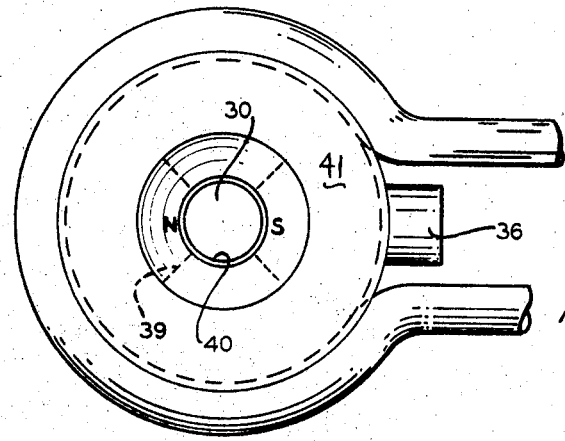
FIG. 6 is a top plan view of the sensor of FIG. 5.
Figure 5:
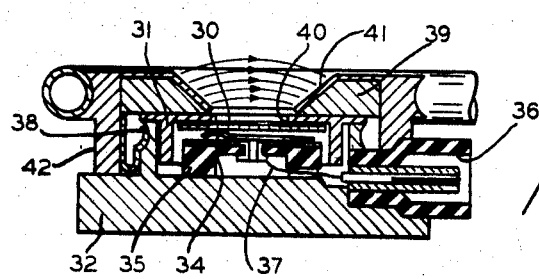
FIG. 5 is a vertical sectional view of another modified form of the sensor of the invention.

In the embodiment of FIGS. 5 and 6, a crystal 30 is mounted in a flanged metal positioning member 31 which is itself received in the central recess of a metal holder or support 32. The crystal is biased into engagement with the positioning member 31 by a contact spring 34 carried by an insulator 35. The insulator is supported by the bottom of the recess as shown. Contact spring 34 is connected to a coaxial connector 36 by a conductor 37. A second contact spring or finger 38 engages the side wall of the support 32 which makes electrical contact with positioning member 31 whereby the latter can also serve as an electrode.

The magnet 39 in the sensor of FIGS. 5 and 6 has substantially the same configuration as magnet 17, FIGS. 1 and 2. It rests on the positioning member 31 surrounding a central opening 40 in the member that exposes a portion of the crystal for deposition. As in the previous modifications, magnet 39 is provided with a water cooled shield 41 having an annular flange 42 that engages support 32 as shown.

The thickness sensors disclosed in FIGS. 1–6 can be placed anywhere in the sputtering system but preferably will be located where the crystal will receive the same amount of deposited material as the substrates. A prototype sensor constructed as disclosed in FIGS. 5 and 6 has been successfully used to continuously monitor film thickness during the sputtering of metals such as gold, aluminum and nichrome, and dielectrics such as aluminum oxide and quartz. The sensor was able to operate at a high power level for a long period of time without failure whereas conventional crystal thickness sensors can only operate at a low power level and generally for the sputtering of metals only. The sensors of the invention can be utilized in either RF or DC sputtering systems.

From the foregoing description, it will be apparent that the present invention provides a greatly improved crystal thickness sensor. As will be understood by those familiar with the art, the invention may be embodied in other specific forms without departing from the spirit or essential characteristics thereof.

I claim:

1. A thickness sensor for sputtering systems comprising a quartz crystal, means to support the crystal so that one area thereof is exposed to receive the deposited material, and a magnet located adjacent the exposed crystal area and arranged so as to produce a magnetic field parallel to the plane of the crystal directly above the exposed area.

2. A sensor as defined in claim 1 wherein the magnet is a permanent magnet.

3. A sensor as defined in claim 1 wherein the magnet is an electromagnet.

4. A sensor for monitoring the thickness of tin films deposited by sputtering comprising a quartz crystal, means to support the crystal so that one area thereof is exposed to receive the deposited material, a magnet mounted on the support means so that the opposite poles of the magnet are located adjacent the periphery of the exposed area of the crystal on opposite sides thereof, and cooling means for the magnet to prevent its overheating by electron bombardment.

5. A sensor as defined in claim 4 wherein the magnet is a permanent magnet.

6. A sensor as defined in claim 4 wherein the magnet is an electromagnet.

7. A sensor as defined in claim 4 wherein the magnet cooling means is a water cooled shield.

* * * * *